US010817280B1

(12) United States Patent
Masrani et al.

(10) Patent No.: US 10,817,280 B1
(45) Date of Patent: Oct. 27, 2020

(54) OVERRIDING SHARED SERVICE INTERFACES

(71) Applicant: Amazon Technologies, Inc., Seattle, WA (US)

(72) Inventors: Ankit Masrani, Seattle, WA (US); Shiwei Ni, Issaquah, WA (US); Cheng Pan, Bellevue, WA (US); Calvin Yue-Ren Kuo, Mercer Island, WA (US); Erik Jacob Sipsma, Seattle, WA (US); Kyunghwan Choi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 28 days.

(21) Appl. No.: 15/985,398

(22) Filed: May 21, 2018

(51) Int. Cl.
*G06F 9/44* (2018.01)
*G06F 9/45* (2006.01)
*G06F 9/445* (2018.01)
*G06F 8/70* (2018.01)
(Continued)

(52) U.S. Cl.
CPC .............. *G06F 8/70* (2013.01); *G06F 8/30* (2013.01); *H04L 63/08* (2013.01); *H04L 65/1073* (2013.01); *H04L 63/101* (2013.01)

(58) Field of Classification Search
CPC ....... G06F 8/30–70; G06F 8/70; H04L 63/08; H04L 65/1073; H04L 63/101
See application file for complete search history.

(56) References Cited

U.S. PATENT DOCUMENTS 6,275,857 B1 * 8/2001 McCartney ........... G06F 9/4843
707/999.202
10,572,226 B2 * 2/2020 Biskup ..................... G06F 8/60
(Continued)

FOREIGN PATENT DOCUMENTS

KR 20170088812 A * 8/2017

OTHER PUBLICATIONS

Microsoft, Connect and communicate with services in service fabric, 2017, pp. 1-12. https://docs.microsoft.com/en-us/azure/service-fabric/service-fabric-connect-and-communicate-with-services (Year: 2017).*

(Continued)

*Primary Examiner* — Mongbao Nguyen
(74) *Attorney, Agent, or Firm* — Thorpe North & Western, LLP.

(57) ABSTRACT

Technologies are described for a local interface override that allows a program code function to be executed on a computing hub and interface with a local service located on the computing hub. An example method may include loading, on a computing hub included in a local device network, a program code function configured to interface with a shared service located in a service provider environment. Loading a local library to overlay a service provider library, where the local library provides a local service interface for a local service located on the computing hub that is similar to a shared service interface for the shared service. Overriding the service provider library with the local library in response to service requests generated by the instance of the program code function; thereby providing the local service interface for the local service located on the computing hub.

20 Claims, 10 Drawing Sheets

(51) Int. Cl.
*G06F 8/30* (2018.01)
*H04L 29/06* (2006.01)

(56) References Cited

U.S. PATENT DOCUMENTS

| | | | | |
|---|---|---|---|---|
| 2005/0188071 | A1* | 8/2005 | Childress | H04L 41/044 709/223 |
| 2006/0143622 | A1* | 6/2006 | Prabandham | G06F 9/445 719/328 |
| 2006/0282840 | A1* | 12/2006 | Stone | G06F 9/44521 719/331 |
| 2007/0006202 | A1* | 1/2007 | Mikkelsen | G06F 9/44552 717/163 |
| 2010/0146060 | A1* | 6/2010 | Graham | A63F 13/352 709/206 |
| 2014/0089490 | A1* | 3/2014 | Kunisetty | G06Q 10/10 709/224 |
| 2014/0317641 | A1* | 10/2014 | Trofin | G06F 9/448 719/328 |
| 2015/0277941 | A1* | 10/2015 | Dobson | G06F 9/44521 717/164 |
| 2016/0357543 | A1* | 12/2016 | Stanton | G06F 8/70 |
| 2017/0102925 | A1* | 4/2017 | Ali | G06F 8/30 |
| 2017/0168777 | A1* | 6/2017 | Britt | G06F 8/20 |
| 2018/0267990 | A1* | 9/2018 | Cherukuri | G06F 8/60 |
| 2019/0005031 | A1* | 1/2019 | Kataria | H04L 67/2852 |
| 2019/0028431 | A1* | 1/2019 | Keller | H04L 61/305 |
| 2019/0187966 | A1* | 6/2019 | Carey | G06F 8/60 |

OTHER PUBLICATIONS

Anne H. Ngu, IoT Middleware: A Survey on Issues and Enabling Technologies, 2017, pp. 1-20. https://ieeexplore.ieee.org/stamp/stamp.jsp?tp=&arnumber=7582463 (Year: 2017).*

Hui Kang, Container and Microservice Driven Design for Cloud Infrastructure DevOps, 2016, pp. 202-211. https://ieeexplore.ieee.org/stamp/stamp.jsp?tp=&arnumber=7484185 (Year: 2016).*

Rafael Oliveira Vasconcelos, An Adaptive Middleware for Opportunistic Mobile Sensing, 2015, pp. 1-10. https://ieeexplore.ieee.org/stamp/stamp.jsp?tp=&arnumber=7165018 (Year: 2015).*

Rachana Ananthakrishnan, Globus Platform-as-a-Service for Collaborative Science Applications, 2015, pp. 1-25. https://www.ncbi.nlm.nih.gov/pubmed/25642152 (Year: 2015).*

Jie Zhang, A Novel P2P O verridden API for Open Data Communications in WWW, 2015, pp. 156-157. https://ieeexplore.ieee.org/stamp/stamp.jsp?tp=&arnumber=7216830&isnumber=7216784 (Year: 2015).*

* cited by examiner

OVERRIDING SHARED SERVICE INTERFACES

BACKGROUND

Electronic devices and computing systems have become ever-present in many aspects of society. Devices may be found in the workplace, at home, or at school. Computing systems may include computing and data storage systems to process and store data. Some computing systems offer centralized, virtual computing options known as service provider environments (e.g., "cloud" environment) that may reduce overall costs, improve availability, improve scalability, and reduce time to deploy new applications.

Advancements in communication technologies have allowed for even relatively simple electronic devices to communicate with other devices and computing systems included in a local device network. For example, the Internet of Things (IoT) is the interconnection of computing devices scattered across the globe using Internet infrastructure. Such devices may be able to capture data, and securely communicate the data over a network to a centralized computing service in a service provider environment. In one example, the devices may send the data to a computing hub or computing node in a local device network, and the computing hub may forward the data received from the devices to the centralized computing service in the service provider environment. In addition, a computing hub may provide services to devices connected to the service hub, such as data aggregation, local computing, messaging, or other services.

DETAILED DESCRIPTION

Figure 1:
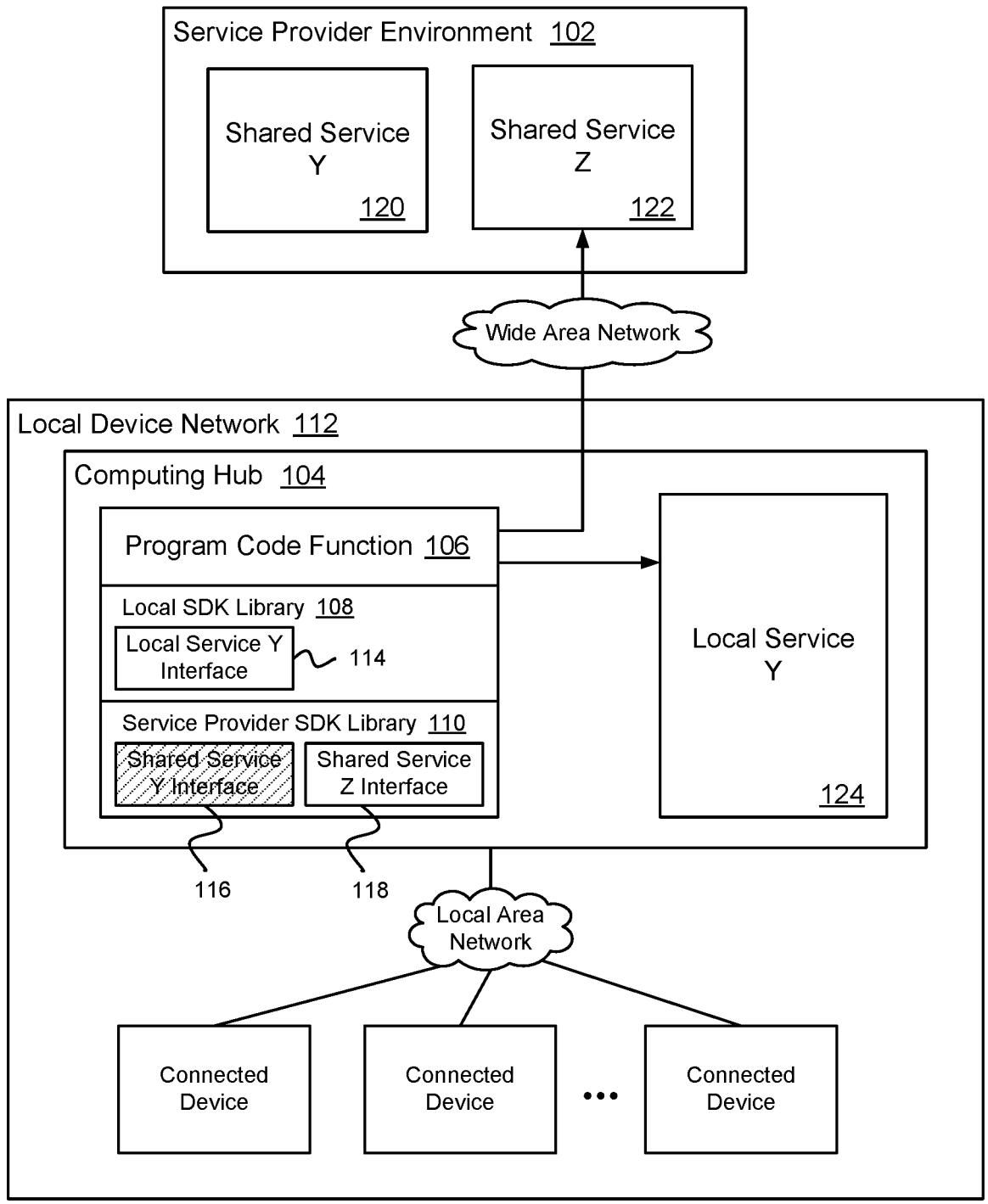
FIG. 1 is a block diagram illustrating an example system for overriding a service interface for a shared service located in a service provider environment with a service interface for a local service located on a computing hub.

Technologies are described for a local interface override that allows a program code function to be executed on a computing hub and make API (application programming interface) calls to a shared service in a service provider environment, but may instead have the API calls directed to a local service located on the computing hub. In one example, a program code function (e.g., a "serverless" function) developed for execution in a service provider environment and configured to utilize a shared service located in the service provider environment may be executed on a computing hub located in a local device network and be directed to interface with a local service on the computing hub instead of the shared service. The local service on the computing hub may be equivalent or similar to the shared service located in the service provider environment. For example, the computing hub may include a storage service, compute service, device shadowing service, messaging service, and other services which may be equivalent or similar to shared services located in the service provider environment.

Implementing the program code function on the computing hub to utilize the local service may include overlaying a service provider SDK library included with or linked to the program code function with replacement code that is a local SDK library for a computing hub environment. The local SDK library may define service interfaces for local services hosted on the computing hub, and the service provider SDK library may define service interfaces for shared services hosted in a service provider environment. Overlaying the local SDK library on the service provider SDK library (e.g., where the local SDK library overrides the service provider SDK library) may override a service interface for a shared services hosted in the service provider environment with a service interface for an equivalent or similar local service hosted on the computing hub, while leaving service interfaces for other shared services hosted in the service provider environment exposed to allow service requests generated by the program code function to also be sent to the shared services in the service provider environment. The replacement of shared services by local services may be selective in that only selected services may be re-directed using the overlaid local SDK library.

As an illustration, the program code function may be configured to utilize a shared storage service and a shared compute service hosted in a service provider environment. The computing hub may include an equivalent or similar local storage service, but the computing hub may not include an equivalent or similar local compute service. Overlaying the local SDK library on the service provider SDK library may override a service interface for the shared storage service with a service interface for the local storage service, allowing the program code function to utilize the local storage service. Because the local SDK library does not include a service interface for a local compute service, overlaying the local SDK library on the service provider SDK library may maintain access to a service interface for the shared compute service, allowing the program code function to utilize the shared compute service located in the service provider environment.

In another example, a service provider endpoint for a shared service included in a service request generated by a program code function may be replaced with a local endpoint for an equivalent or similar local service located on a computing hub. For example, in response to a service request for a shared service generated by a program code function, a runtime service may be configured to determine whether the computing hub includes a local service which is equivalent or similar to a shared service located in the service provider environment, and if so, replace a service provider endpoint (e.g., a uniform resource identifier (URI) for a shared service) for the shared service in the service request with a local endpoint (e.g., a URI for a local service on a computing hub) for the local service on the computing hub, causing the service request to be sent to the local service located on the computing hub instead of sending the service request to the shared service in the service provider environment.

To further describe the present technology, examples are now provided with reference to the figures. FIG. 1 illustrates a high level example for overriding a service interface to a shared service located in a service provider environment 102 with a service interface to a local service on a computing hub 104, allowing a program code function 106 executed on a computing hub 104 to utilize the local service on the computing hub 104, which may have an equivalent interface to the shared service in the service provider environment 102 and provide similar services. As described later in more detail, a program code function 106 configured to interface with one or more shared services 120/122 located in a service provider environment 102 may be hosted on a computing hub 104 included in a local device network 112. The computing hub 104 may include a local service Y 124 which may be equivalent or similar to a shared service Y 120 located in the service provider environment 102. For example, a user may develop a program code function 106 using a service provider SDK (Software Development Kit), which allows the program code function 106 to be executed in the service provider environment 102 (described in FIG. 9) or to be executed locally by a function execution service (shown in FIG. 2) and make API calls to shared services regardless of where the program code function is executing.

Sometime thereafter, the user may decide to deploy the program code function 106 to the computing hub 104 included in the local device network. A function deployment package that includes the program code function 106 and a service provider SDK library 110 may be sent to the computing hub 104 and the program code function 106 may be loaded for execution on the computing hub 104. In loading the program code function 106 on the computing hub 104, a local SDK library 108 may be overlaid on the service provider SDK library 110. The local SDK library 108 may provide a service interface 114 for a local service Y 124 located on the computing hub 104, and the service provider SDK library 110 may provide service interfaces 116/118 for shared services Y and Z located in the service provider environment 102. The local service Y 124 on the computing hub 104 may be equivalent or similar to the shared service Y 120 in the service provider environment 102. For example, the shared service Y 120 and the local service Y 124 may both be storage services having equivalent service interfaces to perform storage operations.

Overlaying the local SDK library 108 on the service provider SDK library 110 may override the service interface 116 for the shared service Y 120 with the service interface 114 for local service Y 124. More specifically, the service interface 114 for local service Y 124 may replace the service interface 116 for the shared service Y 120. Accordingly, because the service interface 114 for local service Y 124 overrides the service interface 116 for shared service Y 120, service requests for shared service Y 120 generated by the program code function 106 may be sent to the local service Y 124 located on the computing hub.

Because the computing hub 104 does not include a local service that is equivalent or similar to the shared service Z 122 in the service provider environment 102, a service interface 118 for shared service Z 122 included in the service provider SDK library 110 may not be overridden by a service interface, and therefore the service interface 118 for shared service Z 122 may be exposed for service requests directed to shared service Z 122. As such, service requests for shared service Z 122 generated by the program code function 106 may be sent to the shared service Z 122 located in the service provider environment 102.

In the past, implementing a program code function on a computing hub may have been difficult because a service provider SDK used to create the program code function may be incompatible with a computing hub environment. For example, a service provider SDK library included with the program code function may not include service interfaces for local services located on the computing hub. As a result, implementing the program code function on a computing hub may have involved having to rebuild the program code function using a SDK for the computing hub environment allowing the program code function to utilize local services on the computing hub. Rebuilding a program code function for a computing hub environment may result in additional time and cost in order to implement the program code function on the computing hub.

The present technology provides improvements for implementing a program code function on a computing hub, where the program code function was developed using a service provider SDK. As one example, an improvement for implementing a program code function on a computing hub includes using the present technology to overlay a local SDK library on a service provider SDK library at execution time, thereby providing a program code function with service interfaces for local services on the computing hub, which may be equivalent or similar to shared services in a service provider environment.

In one example, a local SDK library may be merged with a service provider SDK library to create a merged SDK library, which assigns precedence to a local service located on a computing hub over an equivalent or similar shared service located in a service provider environment. As will be appreciated, the present technology provides additional improvements for implementing a program code function on a computing hub, as described herein.

Figure 2:
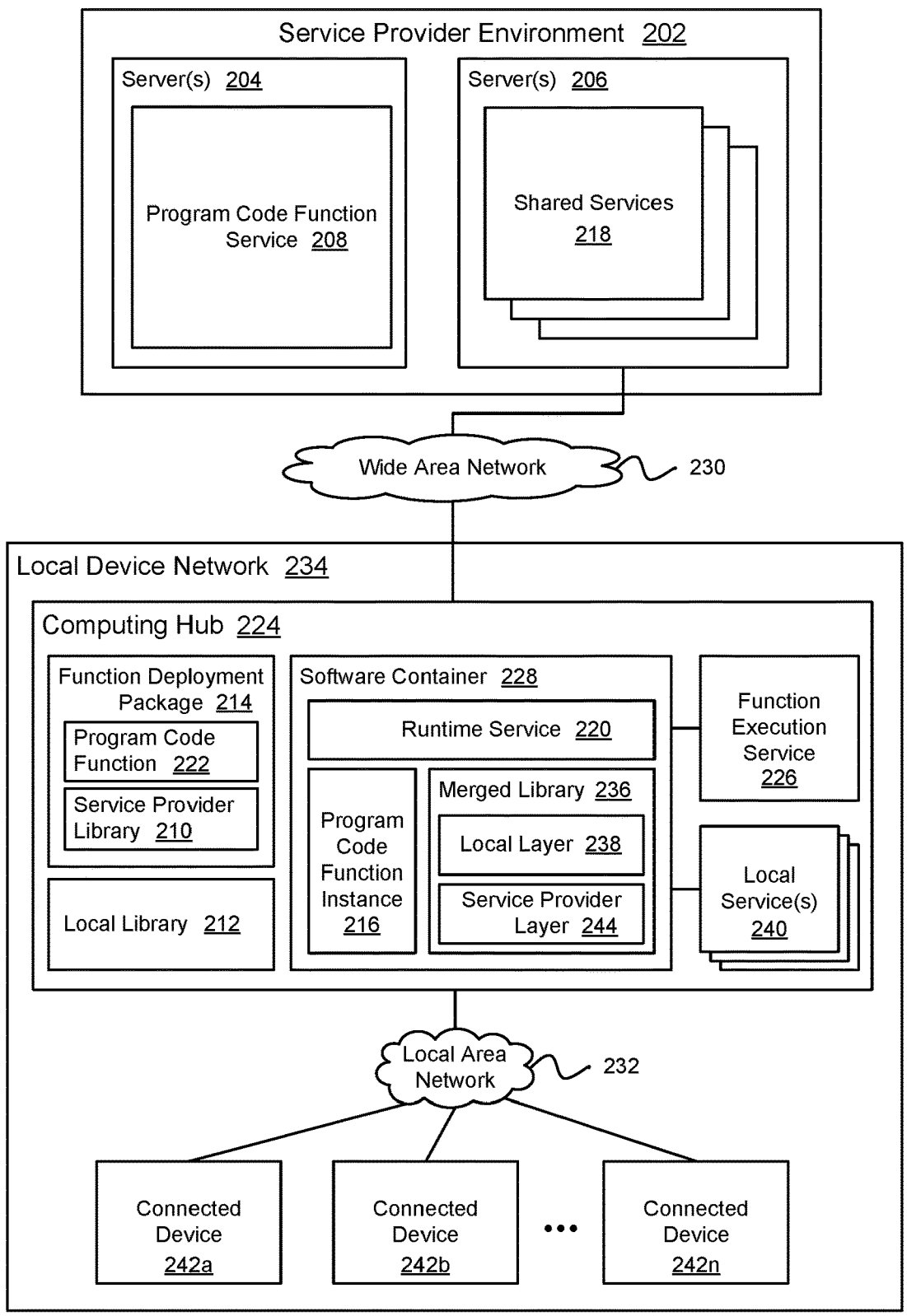
FIG. 2 is a block diagram that illustrates various example components included in a system for implementing a program code function on a computing hub to utilize a local service located on the computing hub.

FIG. 2 illustrates components of an example system environment 200 on which the present technology may be executed. The system environment 200 may include a local device network 234 and a service provider environment 202 (e.g., a "cloud" environment) that are in communication via a wide area network (WAN) 230 (e.g., the internet). The local device network 234 may include one or more computing hubs 224, and one or more connected devices 242a-n, which may be configured to send data to, and access services provided by, a computing hub 224. As will be appreciated, a local device network 234 can include any number of computing hubs 224 and connected devices 242a-n. Illustratively, a local device network 234 may be implemented within a business environment (e.g., manufacturing environment, office environment, retail environment, etc.), home environment, recreational environment, as well as any other suitable environment.

In one example, a computing hub 224 may be a computing device configured to provide various services to connected devices 242a-n included a local device network 234. In one example configuration, a service provider may provide computing hub software to users who may install the computing hub software on one or more of the users' computing devices. The computing hub software, when installed on an edge computing device included in the user's local device network 234, may extend service provider environment capabilities (e.g., messaging, computing, storage, etc.) to connected devices 242a-n configured to connect to a computing hub 224, as well provide an environment to host the user's own program code functions 222. In another example, a service provider may offer a pre-configured, dedicated computing hub 224 device to users. The users may add the computing hub 224 to the user's local device network 234 in order to extend service provider environment capabilities and localized services (e.g., computing, storage, messaging, device shadowing services, machine learning, and other services.) to connected devices 242a-n included in the user's local device network 224, as well as provide services implemented using program code functions 222 developed by the user.

A computing hub 224 may be configured to provide connected devices 242a-n with user developed services provided via program code functions 222 that, for example, may be invoked in response to a request received from a connected device 242a-n. A program code function 222 may comprise a segment of program code that may be like a function, and the program code function 222 may receive parameters, perform processing, make service requests, and provide return values. Once an instance of a program code function 222 has been executed and results have been returned, the instance of the program code function 222 and results generated by the instance of the program code function 222 may be removed from computer memory allocated for executing the instance of the program code function 222.

As described earlier, users (who may be customers of a service provider) may develop program code functions 222 for execution in a service provider environment 202 using a service provider SDK. The service provider SDK may be a set of software development tools that allows a user to create a program code function 222 to execute within a software framework of the service provider environment 202. For example, the service provider SDK may be used to build a function deployment package that includes a program code function 222 and a service provider library 210, and the function deployment package may be uploaded to the service provider environment 202, wherein a program code function service 208 may provide serverless computing functionality for executing the program code function 222 in the service provider environment 202. The service provider library 210 (which may be a service provider SDK library or another service interface library) may contain service interface definitions (e.g., application programming interface (API) definitions) for shared services 218 utilized by the program code function 222. When executed in the service provider environment 202, the program code function 222 may generate a service request directed to a shared service 218 included in the service provider environment 202.

The present technology allows a program code function 222 developed using a service provider SDK to be implemented on a computing hub 224 to utilize local services 240 located on the computing hub 224, without having to rebuild the program code function 222 to utilize the local services 240. As illustrated, the computing hub 224 may include a function execution service 226 which may be configured to manage execution of a program code function instance 216. The function execution service 226 may comprise a serverless platform used to execute a program code function instance 216 in response to requests to invoke the program code function 222, and manage compute resources used by the program code function instance 216. In one example, a computing hub 224 may include functionality for hosting software containers 228, and the function execution service 226 may launch a software container 228 to execute a program code function instance 216. A software container 228 or container image may be a lightweight, stand-alone, executable software package that includes components needed to execute an instance of a program code function instance 216, such as, execution instructions and parameters for a program code function 222, a runtime environment, system tools, system libraries, settings, etc.

In one example, a function deployment package 214 generated using a service provider SDK may be uploaded to the computing hub 224. The function deployment package 214 may include a program code function 222 and dependencies that include a service provider library 210. The function execution service 226 may be configured to invoke the program code function 222 included in the function deployment package 214 by launching a software container 228 that provides an isolated environment on a computing hub 224 for a program code function instance 216 to execute. For example, operating system kernel functionality may be used to isolate computing resources and create separate namespaces in order to provide an isolated (containerized) user space for a program code function 222 to execute. In doing so, the program code function 222 may be contained to the isolated user space, allowing multiple containerized program code functions to utilize a single operating system kernel.

As part of launching the software container 228, the function execution service 226 may load a runtime service 220 into the software container 228. The runtime service 220 may act as an interface between the function execution service 226 and a program code function instance 216. For example, in response to a request received from a connected device 242a-n to invoke a program code function 222, the function execution service 226 may send an execution request to the runtime service 220, and the runtime service 220 may invoke the program code function instance 216 via a handler (e.g., a function entry point). The runtime service 220 may also act as an interface between an instance of a program code function instance 216 and a local service 240 and/or shared service 218, as described below.

In addition, as part of launching the software container 228, the function execution service 226 may load a local library 212 (e.g., a local SDK library or any library containing local service interface definitions) to overlay a service provider library 210 (e.g., a service provider SDK library or any library containing service provider interface definitions) in the software container 228. In one example, overlaying a local library 212 on a service provider library 210 may include creating a merged library 236 that contains one or more service interfaces (e.g., programmatic interface specifications describing services) for local services 240 on a computing hub 224 and one or more service interfaces for shared services 218 included in the service provider environment 202, such that a service interface for a local service 240 overrides (e.g., replaces) a service interface for an equivalent or similar shared service 218. Illustratively, shared services 218 and local services 240 may include, but are not limited to, data store services, compute services, device shadowing services, messaging services, machine learning services, over the air updates, and other services.

As illustrated, a merged library 236 may include a local layer 238 (i.e., a local library layer) and a service provider layer 244 (i.e., a service provider library layer). The local layer 238 may include one or more service interfaces for local services 240 obtained from a local library 212, and the service provider layer 244 may include one or more service interfaces obtained from a service provider library 210. As described later in relation to FIG. 4, a service interface for a local service 240 included in the local layer 238 of the merged library 236 may override or replace a service interface for a shared service 218 included in the service provider layer 244 of the merged library 236. Illustratively, a union mount filesystem implementation tool, such as overlayFS or similar tools may be used to create a merged library 236. The function execution service 226 may load a merged library 236 into a software container 228 and update a library path to include the merged library 236. For example, a library path in the software container may be updated to set an environment variable to the merged library 236.

In one example, a merged library 236 may be created in conjunction with generating a function deployment package 214. For example, at the time that a function deployment package 214 is generated in a service provider environment 202, or on a customer client device (not shown), a local library 212 for local services 240 (e.g. located in the service provider environment 202, client, or located on a computing hub 224) may be overlaid on a service provider library 210 to create a merged library 236, which may be included in the function deployment package 214. The function deployment package 214 may be deployed to a computing hub 224, and the function execution service 226 may load the merged library 236 into a software container 228 and update a library path to include the merged library 236 as part of launching a program code function instance 216.

After mounting a merged library 236 in a software container 228, service requests generated by a program code function instance 216 may reference a service interface in the merged library 236. In one example, as part of generating a service request, a program code function instance 216 may reference a local layer 238 of a merged library 236 for a service interface for a local service 240 that may be equivalent or similar to a shared service 218. In the event that the merged library 236 does not include a service interface for a local service 240, the program code function instance 216 may reference a service provider layer 244 of the merged library 236 to obtain a service interface for the shared service 218. As indicated above, the runtime service 220 may act as an interface between a program code function instance 216 and a local service 240 and/or a shared service 218. For example, in response to a service request generated by an instance of a program code function instance 216, the runtime service 220 may cause the service request to be sent to a service (i.e., a local service 240 or shared service 218) via a service interface as specified in the merged library 236.

In another example, a local library 212 may be mounted in a software container 228 to replace a service provider library 210. The local library 212 may be configured to include service interfaces for one or more local services 240 included on a computing hub 224, as well as service interfaces for shared services 218 located in a service provider environment 202, for which a local service 240 on the computing hub 224 does not exist. As part of launching a software container 228 to invoke a program code function instance 216, the function execution service 226 may mount the local library 212 in the software container 228 by updating a library path in the software container 228 to replace a service provider library 210 with the local library 212.

In another example, a service interface for a shared service 218 may be replaced with a service interface for a local service 240 at execution time. For example, the runtime service 220 may be configured to replace a reference to a service provider endpoint (e.g., "shared-service.us-west-2.servicecloud.com") for a shared service 218 with a reference to a local endpoint (e.g., "local-service.hub") for a local service 240 as part of handling a service request generated by a program code function instance 216. For example, in response to receiving a service request generated by a program code function instance 216, the runtime service 220 may identify a shared service 218 indicated in the service request and map the shared service 218 to an equivalent or shared local service 240 located on the computing hub 224, and forward the service request to the local service 240 via a local endpoint for the local service 240. A shared service 218 may be mapped to a local service 240 using service identifiers (e.g., resource name). For example, a segment of a shared resource name (e.g., "cloud-service:object-datastore") for a shared service 218 may correspond to a segment of a local service identifier (e.g., "local-service:object-datastore") for a local service 240, and the corresponding segment (e.g., "object-data-store") may be used to map a shared service 218 to a local service 240. In the case that a shared service 218 is not mapped to a local service 240, a service request generated by a program code function instance 216 may be sent to a service provider endpoint for the shared service 218 located in the service provider environment 202.

In yet another example, a function deployment package 214 may be generated to include a combined library (not shown) that includes both service interface definitions for shared services 218 located in the service provider environment 202 and service interface definitions for local services 240 located on a computing hub 224. When deployed to a computing hub 224, a program code function 222 may be configured to use service interface definitions for local services 240 located on the computing hub 224 as defined in the service interface library, and use service interface definitions for shared services 218, as defined in the service interface library, when a local service that is similar to a shared service does not exist on the computing hub 224. Also, when deployed to a computing hub 224, a load balancing technique may be used to send service requests generated by a program code function instance 216 to shared services 218 located in a service provider environment 202 when local services 240 located on the computing hub 224 may be overloaded.

A connected device 242a-n may be one of many physical electronic devices that create a large network of addressable devices and/or eventually addressable devices. A connected device 242a-n may be addressable over a wired network and/or a wireless network, such as WI-FI, Zigbee, Z-Wave, BLUETOOTH, NFC (Near Field Communication), cellular, and the like. A connected device 242a-n may be configured to communicate with a service hub 224 over the network. Also, in some examples, a connected device 242a-n may be configured to communicate with computing resources located in a device services network (shown in FIG. 8) included in the service provider environment 202. For example, requests from connected devices 242a-n directed to shared services 218 located in the service provider environment 202 may be routed, through a computing hub 224 and the device services network, to the shared services 218 in the service provider environment 202.

In addition to computing hubs 224 and connected devices 242a-n, the local device network 234 may include network devices (e.g., routers, switches, etc.) used to implement a local area network (LAN) 232. As will be appreciated, a network used to implement the system environment 200 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain services are described in connection with this technology. In one example configuration, a service may be considered a service module with one or more processes executing on computer hardware. Such service modules may be centrally hosted functionality or a service application that may receive requests and provide output to other services or devices. For example, service modules may be considered on-demand computing that are hosted in a computing hub 224, server 204/206, virtualized service environment, grid or cluster computing system. An API may be provided for each service module to send requests to and receive output from the service. Such APIs may also allow third parties to interface with the service modules and make requests and receive output from the service modules. While FIG. 2 illustrates an example of a system that may implement the techniques above, many other similar or different environments are possible. The example environments discussed and illustrated above are merely representative and not limiting.

Figure 3:
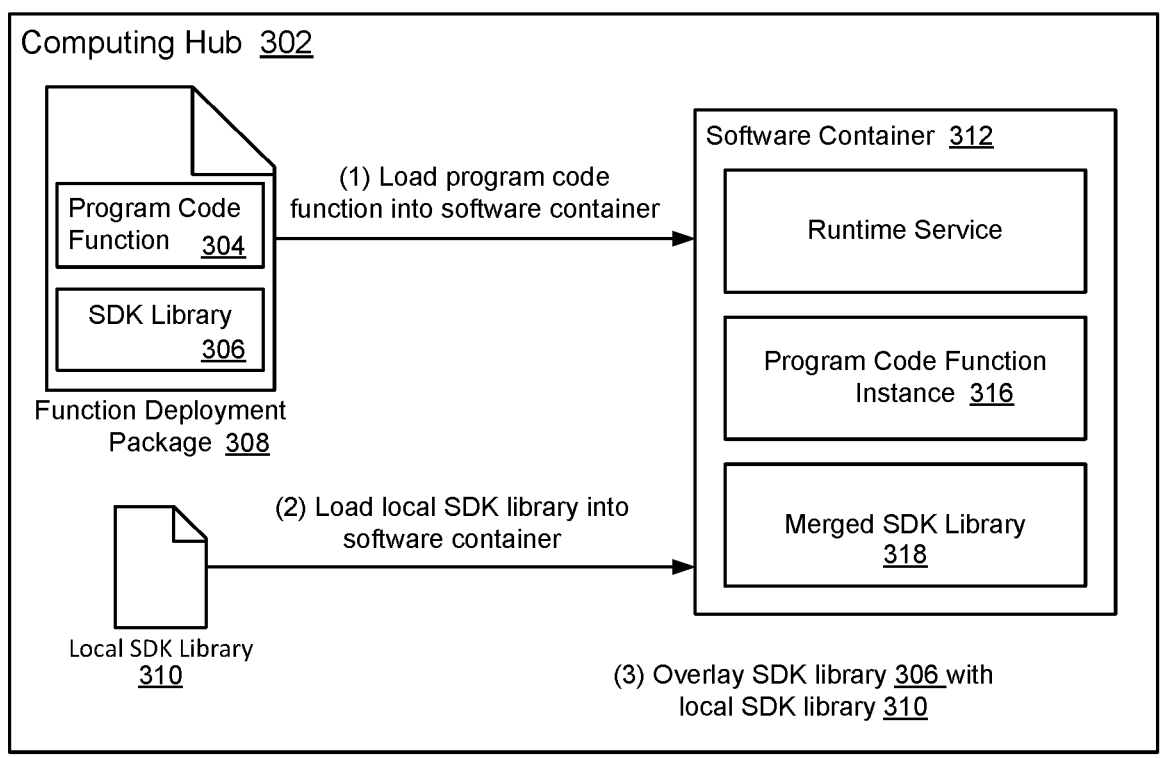
FIG. 3 illustrates an example of launching a software container to invoke an instance of a program code function on a computing hub to utilize a local service on the computing hub.

Moving now to FIG. 3, a diagram illustrates an example method for launching a software container 312 on a computing hub 302 as part of implementing a program code function 316 on a computing hub 302. In order to provide some context, a brief description of program code function development using a service provider SDK is provided. A service provider may provide users with a service provider SDK. A user may develop a program code function 304 using the service provider SDK and upload the program code function 304 to a service provider environment. The service provider SDK may comprise a set of software development tools that includes a SDK library 306 defining a set of service interfaces (e.g., programmatic interface specifications) that describe shared services (e.g., storage services, compute services, messaging services, etc.) located in the service provider environment. The program code function 304 may be developed to access the shared services.

As part of developing a program code function 304, a user may create a function deployment package 308 that includes the program code function 304 and dependencies, including a SDK library 306 containing service interface definitions for shared services located in a service provider environment. As a non-limiting example, a function deployment package 308 may include a compressed file that contains a program code function 304 (e.g., computer code), a SDK library 306, and any other dependencies needed to execute the program code function 304 in a service provider environment. A user may deploy a function deployment package 308 to a service provider environment, wherein the program code function 304 may be hosted on computing resources included in the service provider environment, and the program code function 304 may utilize shared services located in the service provider environment.

The present technology allows a program code function 304 developed using a service provider SDK (or another SDK which may be incompatible with a computing hub environment) to be hosted and executed on a computing hub 302 and utilize local services located on the computing hub 302. A function deployment package 308 that includes a program code function 304 and a SDK library 306 may be deployed to a computing hub 302 so that the program code function 304 can be hosted on the computing hub 302. Thereafter, the program code function 304 may be implemented on the computing hub 302 by launching a software container 312 configured to include the program code function 304 and the SDK library 306 obtained from the function deployment package 308. Launching the software container 312 may include loading a local SDK library 310 into the software container 312. The local SDK library 310 may define a set of service interfaces (e.g., programmatic interface specifications) that describe local services available on the computing hub 302. The service interfaces may be used to access the local services on the computing hub 302. The local SDK library 310 may then be used to create a merged SDK library 318 by overlaying the local SDK library 310 on the SDK library 306, as described below.

Figure 4:
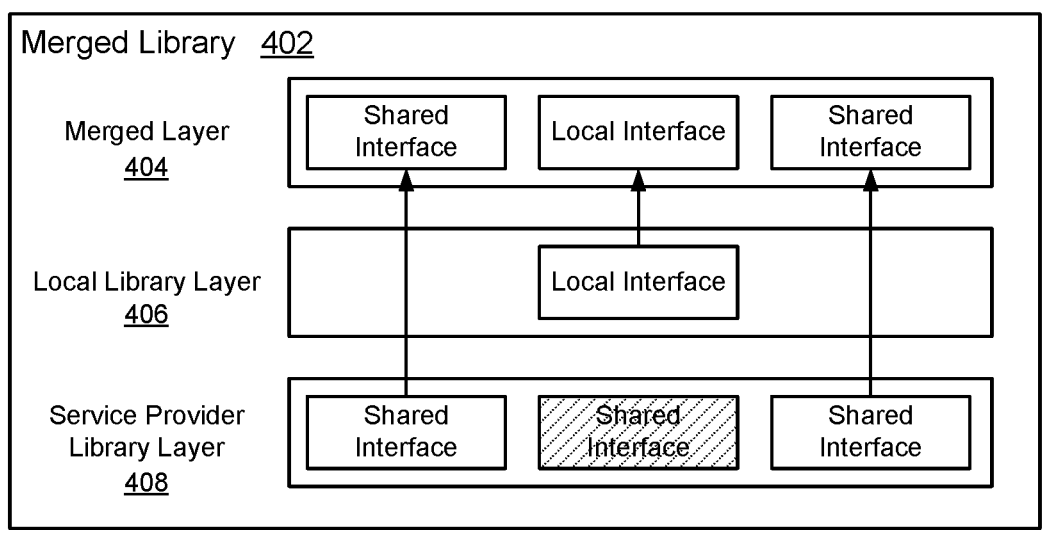
FIG. 4 illustrates an example of a merged library used to override a service provider library with a local library.

FIG. 4 illustrates an example of a merged library 402 which may be used to override a service provider library with a local library. The merged library 402 may include a service provider library layer 408, a local library layer 406, and a merged layer 404. The service provider library layer 408 may contain shared service interfaces for shared services located in a service provider environment. The local library layer 406 may contain local service interfaces for local services located on a computing hub. The merged layer 404 may be created by overlaying the local library layer 406 on the service provider library layer 408. In doing so, a local service interface for a local service overrides a shared service interface for an equivalent or similar shared service, and the local service interface is included in the merged layer 404. A shared service interface for a shared service, for which a local service does not exist, is left exposed, and is therefore included in the merged layer 404. After creating the merged layer, the local library layer 406 and the service provider library layer 408 may be removed.

In one example, overlaying a local library layer 406 on a service provider library layer 408 may include mapping a resource name for a local service to a resource name for a shared service, and overlaying a local service interface for the local service on the shared service interface for the shared service in the merged library 402. Mapping may be performed by identifying a resource name (or a segment of a resource name) assigned to a local service that may be similar to a resource name (or segment of a resource name) assigned to a shared service. As a specific example, a segment ("compute-service") of the local service resource name "local-service:compute-service" may correspond to a segment ("compute-service") of the shared service resource name "cloud-service:compute-service". A library merging process may include obtaining resource names for services from both a local library and a service provider library, and analyzing the resource names to identify which resource names correspond to one another. A resource name for a local service that corresponds to a resource name for a shared service may be identified, and a local service interface for the local service may override a shared service interface for the shared service, resulting in the local service interface being included in the merged layer 404 of a merged library 402.

Figure 5:
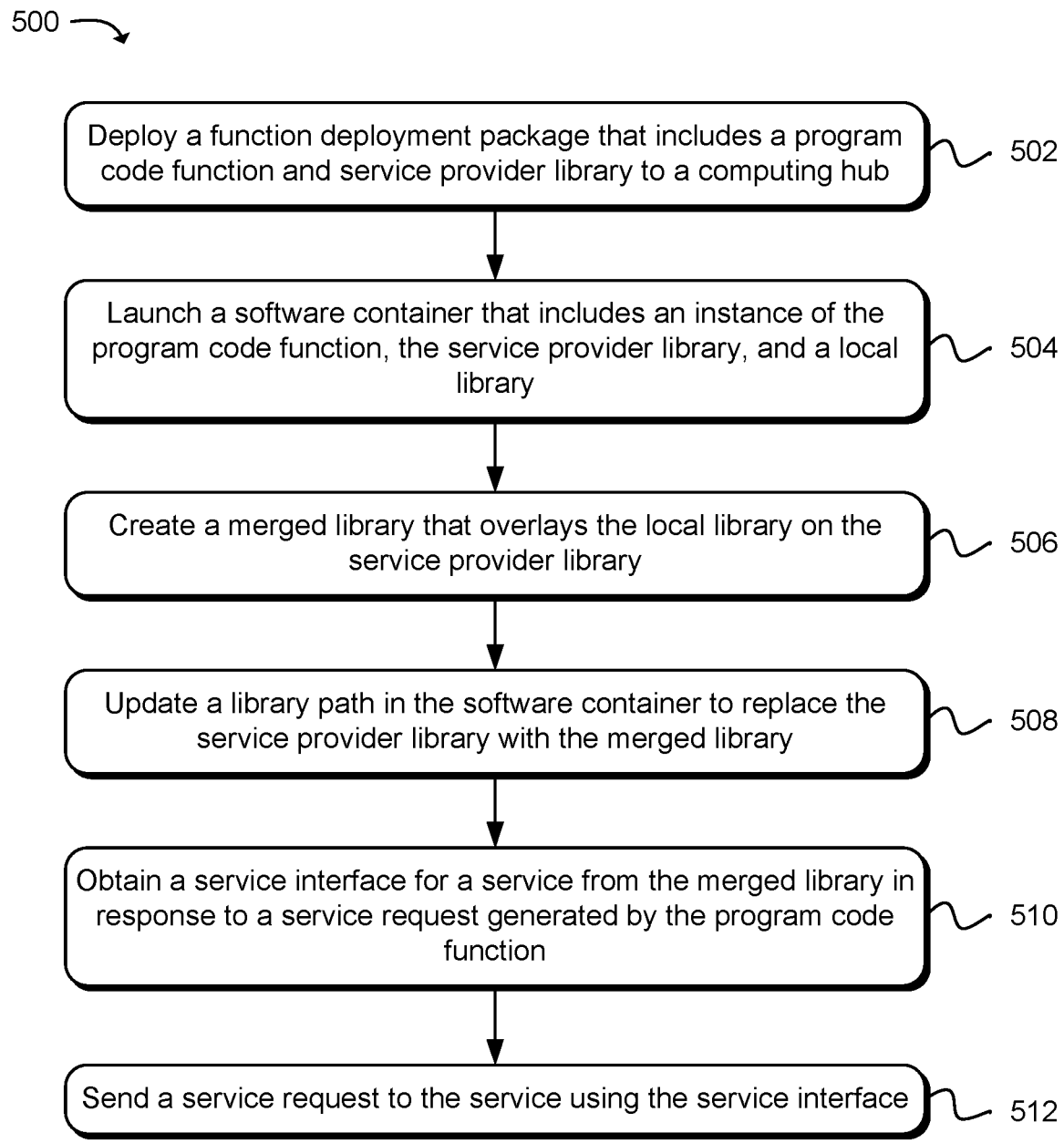
FIG. 5 is a flow diagram illustrating an example method for invoking a program code function on a computing hub to utilize a local service located on the computing hub.

FIG. 5 is a flow diagram illustrating an example method 500 for invoking a program code function on a computing hub to utilize at least one local service located on the computing hub. A program code function may be developed using a service provider SDK to utilize shared services provided by a service provider, and then the program code function may be deployed to a computing hub and utilize local services on the computing hub that are similar to the shared services provided by the service provider.

Illustratively, a user may initially deploy a program code function to a service provider environment in order to provide a service or functionality to one or more connected devices. As an illustration, a program code function may be configured to process sensor data received from a connected device and store the processed data to a shared storage service. Later, the user may deploy the program code function to a computing hub located in a local device network that includes the connected device. The computing hub may include a local version of the shared storage service, which can be utilized by the program code function as described below.

As in block 502, a function deployment package containing the program code function and dependencies, including a service provider library, may be deployed to a computing hub. Thereafter, the program code function may be invoked on the computing hub, as in block 504, by launching a software container that includes an instance of the program code function and the service provider library obtained from the function deployment package, as well as a local library that includes one or more service interfaces for one or more local services on the computing hub. As an illustration, the service provider library may include a service interface for a shared storage service located in the service provider environment, and the local library may include a service interface for a local storage service on the computing hub that provides services similar to the shared storage service.

As in block 506, a merged library that overlays the local library on or merges the local library with the service provider library may be created, as described earlier in relation to FIG. 4. After creating the merged library, the merged library may be mounted in the software container. For example, as in block 508, a library path may be updated to replace the service provider library with the merged library. As an example, a "CLASSPATH" variable for the software container may be set to point to the merged library.

After launching the software container, the instance of the program code function may be executed in the software container and the program code function may generate service requests directed to various services. As in block 510, in response to a service request generated by the program code function, a service interface for a service (i.e., a local service or a shared service), to which the service request is directed, may be accessed using the merged library, and as in block 512, a service request may be sent to the service using the service interface. For example, a runtime service that executes in the software container with the program code function may intercept a service request generated by the program code function, obtain a service interface for a service (e.g., obtain a local service URI or a shared service URI) associated with the service request from the merged library, and forward the service request to the service (i.e., the local service or the shared service) via the service interface obtained from the merged library.

The merged library may determine whether a service request is sent to a local service or a shared service. That is, if the merged library contains a local service interface that overlays a shared service interface for a shared service to which the service request is directed, then the local service interface may be used to send the service request to the local service located on the computing hub. Whereas, if the merged library does not contain the local service interface, then the shared service interface may be used to send the service request to the shared service located in the service provider environment. As an illustration, the program code function may generate a service request to store processed data received from a sensor device to a shared storage service located in the service provider environment. In the case that the merged library contains a local service interface for a local storage service on the computing hub that is equivalent to the shared storage service, the service request may be sent to the local storage service via the local service interface. In the case that the merged library does not contain a local service interface, the service request may be sent to the shared storage service via a shared service interface obtained from the merged library.

Figure 6:
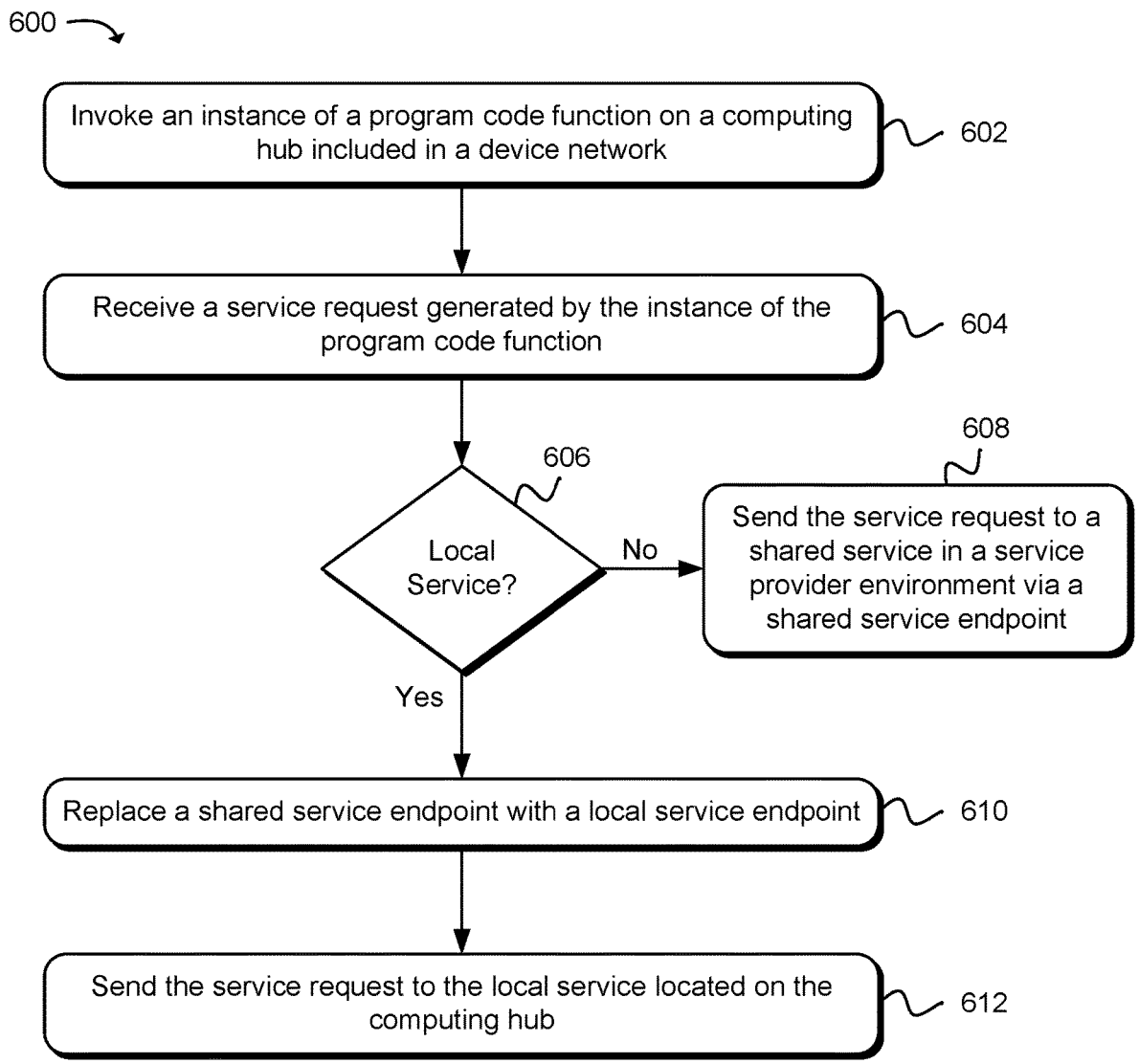
FIG. 6 is a flow diagram illustrating an example method for invoking a program code function and replacing a shared service endpoint for a shared service with a local service endpoint for a local service in response to a service request generated by a program code function.

FIG. 6 is a flow diagram that illustrates an example method 600 for invoking a program code function and replacing a shared service endpoint reference with a local service endpoint reference in response to a service request generated by a program code function. An endpoint reference for a shared service may be an API that includes a URL (Uniform Resource Locator) of the shared service on a server included in a service provider environment. An endpoint reference for a local service may be an API that includes a URL of the local service on the computing hub.

As in block 602, an instance of a program code function may be invoked on a computing hub that is included in a local device network, as described previously. During execution, as in block 604, the instance of the program code function may generate a service request. The service request may be directed to a shared service located in a service provider environment. For example, the service request may include a shared service endpoint used to send the service request to the shared service. A runtime service, which executes in a software container along with the program code function, may be configured to manage the service request by replacing the shared service endpoint with a local service endpoint when a local service that is equivalent or similar to the shared service exists on a computing hub. For example, in response to a service request generated by the program code function, the runtime service may determine (e.g., using mapping) whether the computing hub includes a local service that is equivalent or similar to a shared service referenced in the service request. In one example, a resource name for a shared service may be compared to resource names for local services to determine whether a similar or replacement local service exists on the computing hub.

As in block 606, in the case that the computing hub includes a local service that is equivalent similar to the shared service referenced by the service request generated by the program code function, then as in block 610, the runtime service may replace a shared service endpoint in the service request with a local service endpoint. Thereafter, as in block 612, the service request may be sent to the local service located on the computing hub. As an illustration, a service request that includes a shared storage service endpoint (e.g., "shared-storage-service.servicecloud.com") may be updated to substitute the shared storage service endpoint with a local storage service endpoint (e.g., "local-storage-service.hub"), and the updated service request may be processed, sending a storage request to the local storage service via the local storage service endpoint (e.g., "local-storage-service.hub").

Returning to block 606, in the case that the computing hub does not include a local service that is equivalent or similar to the shared service referenced by the service request, then as in block 608, the service request may be sent to the shared service in the service provider environment via the shared service endpoint included in the service request. That is, because an equivalent or similar local service does not exist on the computing hub, the service request generated by the program code function may not be updated to replace a shared service endpoint specified in the service request. Rather, the service request may be sent to a shared service in the service provider environment via the shared service endpoint specified in the service request.

Figure 7:
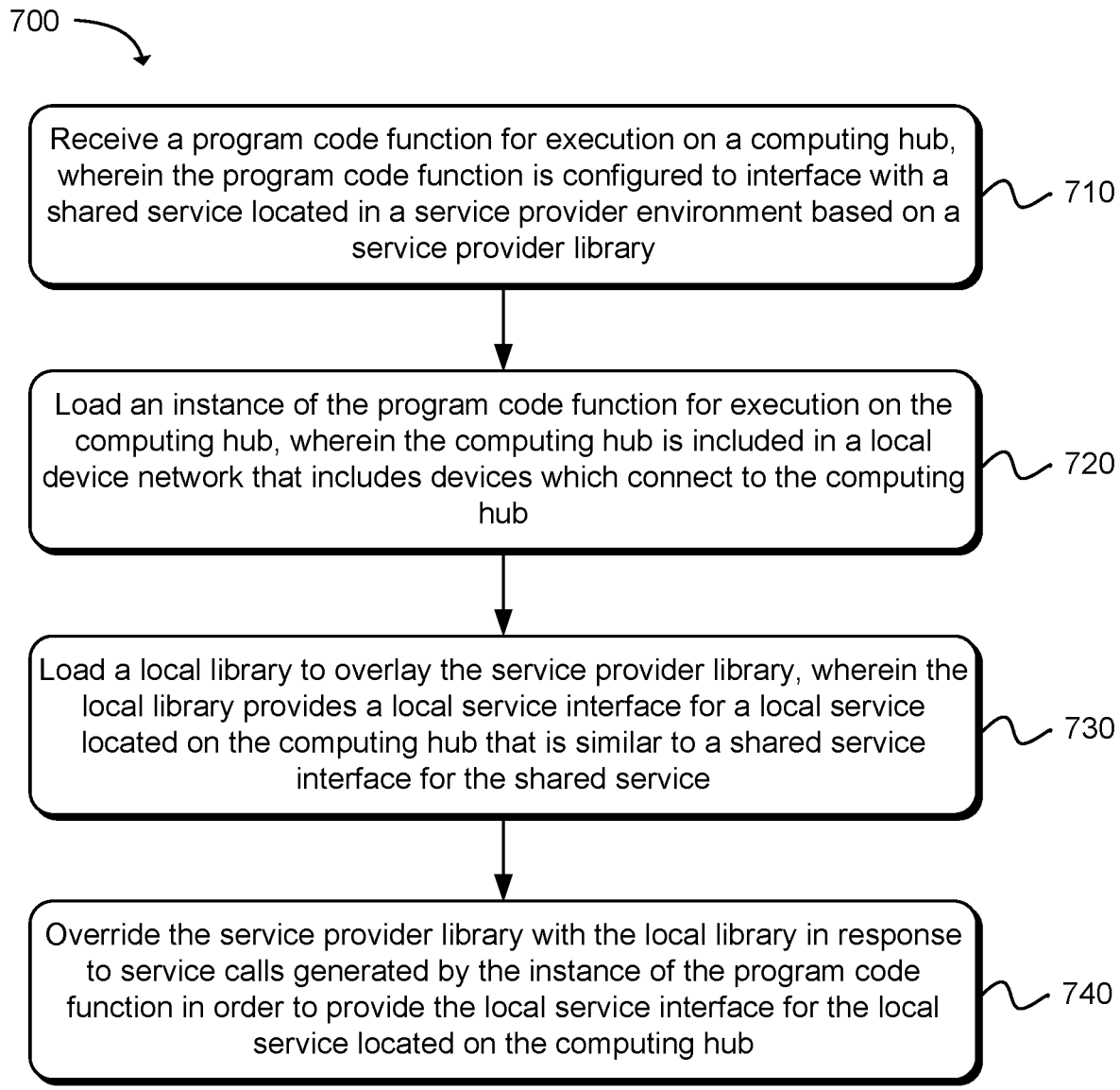
FIG. 7 is a flow diagram that illustrates an example method for overriding a service provider library with a local library.

FIG. 7 is a flow diagram illustrating an example method 700 for overriding a service provider library with a local library. As in block 710, a program code function may be received for execution on a computing hub, wherein the program code function may be configured to interface with a shared service located in a service provider environment based on a service interface defined in a service provider library. For example, the program code function may be configured to process data received from devices connected to the computing hub using, in part, one or more local services located on the computing hub, or one or more shared services located in the service provider environment when the one or more local services are not available on the computing hub.

In one example, receiving the program code function at the computing hub may include receiving a function deployment package that contains a program code function and dependencies that include a service provider library. After receiving the program code function, as in block 720, an instance of the program code function may be loaded for execution on the computing hub, wherein the computing hub may be included in a local device network that includes devices which connect to the computing hub. In one example, a software container may be launched that provides an isolated environment on the computing hub for an instance of the program code function to execute.

As in block 730, a local library may be loaded to overlay the service provider library, wherein the local library provides a local service interface to a local service located on the computing hub that may be similar to a shared service interface for the shared service. In one example, loading the local library to overlay the service provider library may include creating a merged library that includes a local library layer that overlays a service provider library layer. The local library layer may include service interfaces to local services located on the computing hub, and the service provider library layer may include service interfaces to shared services located in the service provider environment. In one example, the merged library may be loaded into a software container on the computing hub and a library path may be updated to include the merged library.

As in block 740, the local library may override the service provider library in response to service requests generated by the instance of the program code function in order to provide the local service interface for the local service located on the computing hub. For example, the instance of the program code function may reference a local library layer of the merged library and obtain a service interface for a local service located on the computing hub, and obtain a shared service interface for the shared service linked to the service request when the local library layer of the merged library does not include a local service interface to a local service for the service request.

Figure 8:
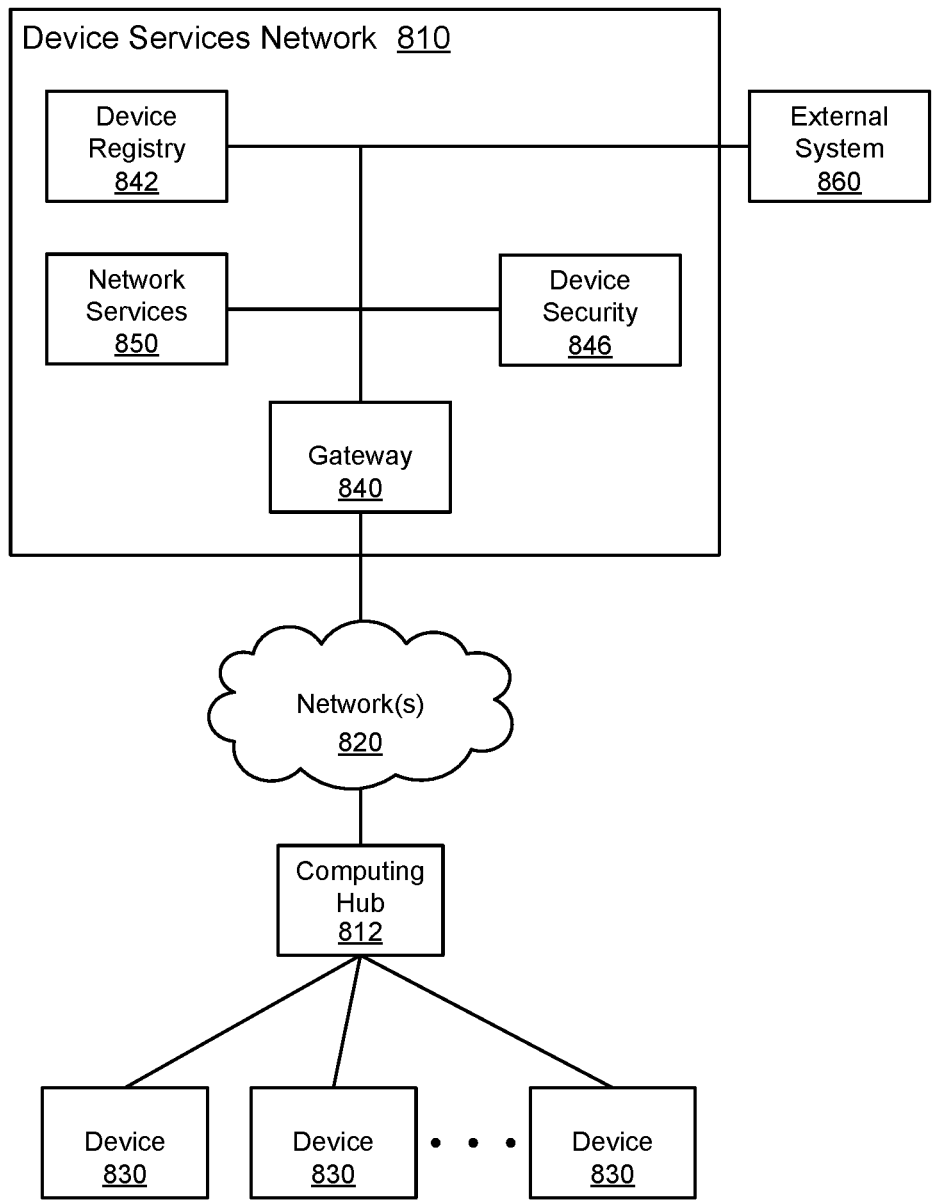
FIG. 8 is a block diagram illustrating an example computer networking architecture for a device services environment.

FIG. 8 is a block diagram illustrating an example device services environment 810 with which the devices described earlier may communicate. The device services environment 810, which may be referred to as a device communication environment or system that comprises various resources made accessible via a gateway server 840 to services hubs 812 and devices 830 that access the gateway server 840 via a network 820, such as a local wireless network that provides access to a wide area network. The devices 830 may access the device services environment 810 through the services hubs 812 in order to access network and device services, such as data storage and computing processing features. Services operating in the device services environment 810 may communicate data and publication messages to the devices 830, via the services hubs 812, in response to requests from the devices 830 and/or in response to computing operations within the services.

The device services environment 810 may comprise communicatively coupled component systems 840, 842, 846, and 850 that operate to provide services to the devices 830. The gateway server 840 may be configured to provide an interface between the devices 830 and the device services environment 810. The gateway server 840 receives requests from the devices 830 and forwards corresponding data and publication messages to the appropriate systems within the device services environment 810. Likewise, when systems within the device services environment 810 attempt to communicate data instructions to the devices 830, the gateway server 840 routes those requests to the correct device 830.

The gateway server 840 may be adapted to communicate with varied devices 830 using various different computing and communication capabilities. For example, the gateway server 840 may be adapted to communicate using either TCP (Transmission Control Protocol) or UDP (User Datagram Protocol) protocols. Likewise, the gateway server 840 may be programmed to receive and communicate with the devices 830 using any suitable protocol including, for example, MQTT (Message Queue Telemetry Transport), CoAP (Constrained Application Protocol), HTTP (Hypertext Transfer Protocol), and HTTPS (HTTP secure). The gateway server 840 may be programmed to convert the data and instructions or publication messages received from the devices 830 into a format that may be used by other server systems comprised in the device services environment 810. In one example, the gateway server 840 may be adapted to convert a publication message received using the HTTPS protocol into a JSON (JavaScript Object Notation) formatted publication message that is suitable for communication to other servers within the device services environment 810.

The gateway server 840 may store, or may control the storing, of information regarding the devices 830 that have formed a connection to the particular gateway server 840 and for which the particular gateway server 840 may be generally relied upon for communications with the device 830. In one example, the gateway server 840 may have stored thereon information specifying the particular device 830 such as a device identifier. For each connection established from the particular device 830, the gateway server 840 may also maintain information identifying the connection. For example, a connection identifier may be generated and stored for each connection established with a particular device 830. Information relating to the particular connection may also be stored. For example, information identifying the particular socket of the gateway server 840 on which the connection was established, as well as information identifying the particular protocol used by the device 830 on the connection may be stored by the gateway server 840. Information such as the socket and protocol may be used in order to facilitate further communications via the particular connection.

In one example, the gateway server 840 may communicate via any suitable networking technology with a device registry server 842. The device registry server 842 may be adapted to track the attributes and capabilities of each device

830. In an example, the device registry sever 842 may be provisioned with information specifying the attributes of the devices 830. The device registry server 842 may comprise data specifying rules or logic (e.g., automation rules) for handling various requests that may be received from the devices 830. The device registry server 842 may be programmed to convert specialized device functions or commands received in particular communication protocols such as, for example HTTPS, MQTT, CoAP, into functions or commands using particular protocols that are understood by other of the servers in the device services environment 810. In one example, the device registry server 842 may be provisioned with information specifying that upon receipt of a particular request from a particular device 830, a request should be made to store the payload data of the request in a particular network service server 850. The device registry server 842 may be similarly programmed to receive requests from servers 842, 850 and convert those requests into commands and protocols understood by the devices 830.

The device security server 846 maintains security-related information for the devices 830 that connect to the device services environment 810. In one example, the device security server 846 may be programmed to process requests to register devices 830 with the device services environment 810. For example, entities such as device manufacturers, may forward requests to register devices 830 with the device services environment 810. The device security server 846 receives registration requests and assigns unique device identifiers to devices 830 which use the device identifiers on subsequent requests to access the device services environment 810. The device security server 846 stores, for each registered device, authentication information that may be provided during the device registration process. For example, a request to register a device 830 may comprise information identifying the device 830 such as a device serial number and information for use in authenticating the device 830. In one example, the information may comprise a digital certificate and may comprise a public key of a public key-private key pair. The information may be stored in relation to the assigned device identifier for the particular device 830. When the device 830 subsequently attempts to access the device services environment 810, the request may be routed to the device security server 846 for evaluation. The device security server 846 determines whether authentication information provided in the request is consistent with the authentication information stored in relation to the device identifier and provided during the registration process.

The device security server 846 may be further programmed to process request to associate particular entities (individuals or organizations) with particular devices 830. The device security server 846 may be adapted to receive requests to register entities, which may be, for example, individuals, users, accounts, and/or organizations, as authorized to control or communicate with a particular device 830. In one example, a request may be received from an individual or organization that may have purchased a device 830 from a manufacturer. For example, the device may be a dishwasher, thermostat, or lighting assembly that an individual or organization purchased from the manufacturer. The individual or organization may initiate a request to register the device 830 with the individual or an organization with which the organization is associated. The request may be routed to a web services server which may be comprised in device services environment 810 or which communicates the request to the device services environment 810. The request identifies the device 830 and the particular entity (individual or organization) that is requesting to be associated with the device 830. In one example, the request may comprise a unique device identifier that was assigned when the device 830 was registered with the system. The request further may comprise information uniquely identifying the entity that is registering as having authority to communicate with and/or control the particular device 830.

The device security server 846 stores the information identifying the particular entity in relation with the device identifier. When the particular entity subsequently attempts to control or communicate data to the particular device 830, the device security server 846 may use the information to confirm that the particular entity is authorized to communicate with or control the particular device 830. When an entity that has not been registered as being authorized to communicate with the device 830 attempts to communicate with or control the device 830, the device security server 846 may use the information stored in the device security server 846 to deny the request.

A network services server 850 may be any resource or processing server that may be used by any of servers 840, 842, or 846 in processing requests from the devices 830. In one example, network services server 850 may provide data storage and retrieval services and/or on-demand processing capacity. In an example scenario, the network services server 850 may be any of numerous network accessible services including, for example, web or cloud-based services. In one example, the web services server 850 may be programmed to provide particular processing for particular devices 830 and/or groups of devices 830.

Servers 840, 842, 846, and 850 may be communicatively coupled via any suitable networking hardware and software. For example, the servers may communicate via a local area network or wide area network.

An external system 860 may access device services environment 810 for any number of purposes. In one example, an external system 860 may be a system adapted to forward requests to register devices 830 with the device services environment 810. For example, an external system 860 may include a server operated by or for a device manufacturer that sends requests to device services environment 810, and device security server 846 in particular, to register devices 830 for operation with device services environment 810. Similarly, the external system 860 may be a system operated to provide a gateway for entities (individuals or organizations) to register an ownership or control relationship with a particular device 830.

The devices 830 may be any device that may be communicatively coupled via a services hub 812 or a network 820, with the device services environment 810. For example, the devices 830 may be computing devices such as smart phones and tablet computers, automobiles, appliances such as washers and driers, industrial sensors, switches, control systems, etc. In one example, each of the devices 830 may communicate over the network 820 to store data reflecting the operations of the particular device 830 and/or to request processing provided by, for example, network services server 850. While FIG. 8 depicts three devices 830, it will be appreciated that any number of devices 830 may access the device services environment 810 via the gateway server 840. Further it will be appreciated that the devices 830 may employ various different communication protocols. For example, some devices 830 may transport data using TCP, while others may communicate data using UDP. Some devices 830 may use MQTT, while others may use CoAP, and still others may use HTTPs. It will also be appreciated that each of devices 830 may be programmed to send and receive particular functions or commands in its requests that are not compatible with other devices or even the systems within device services environment 810. The gateway server 840 may be programmed to receive and, if needed, attend to converting such requests for processing with the device services environment 810.

Figure 9:
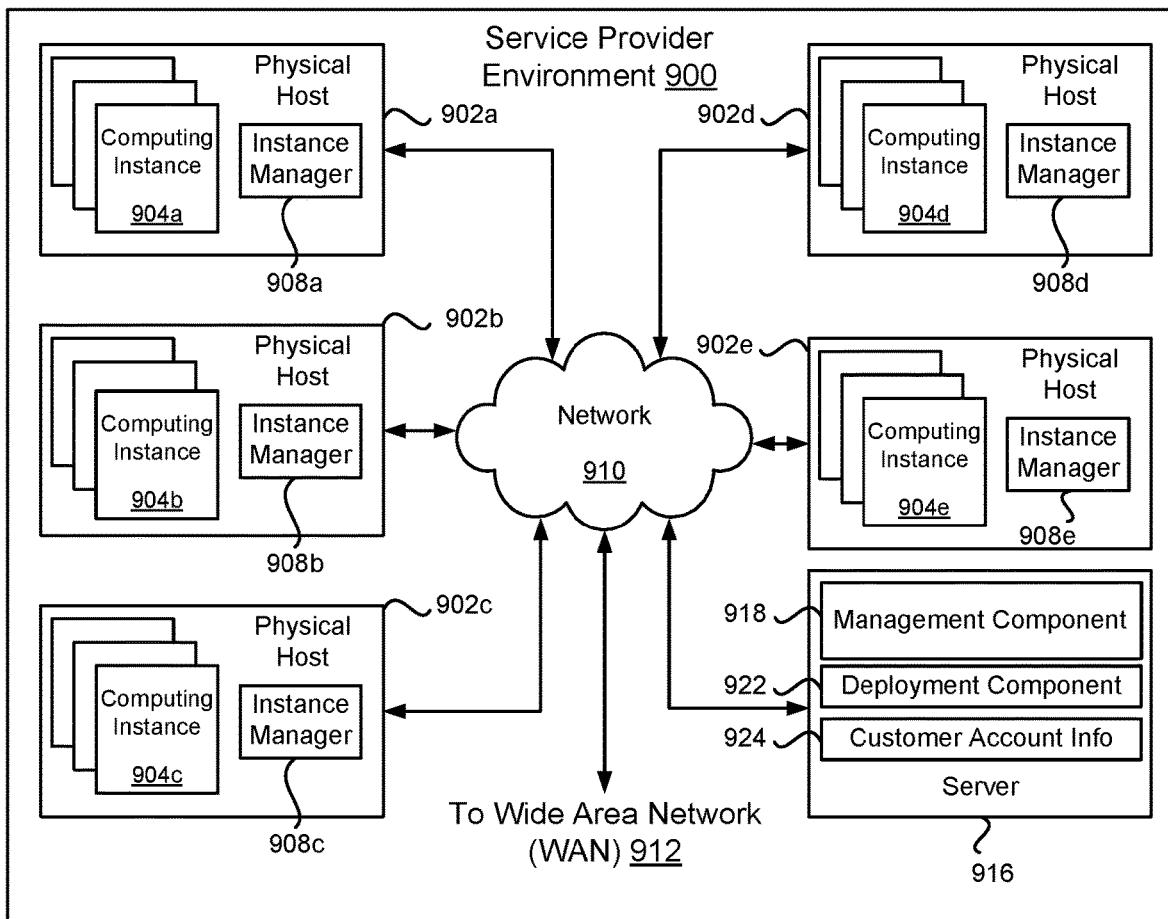
FIG. 9 is a block diagram that illustrates an example service provider environment.

FIG. 9 is a block diagram illustrating an example service provider environment 900 that may be used to implement the device services environment described above. The service provider environment 900 may include computing resources that may include physical hosts 902a-e, computing instances 904a-e, virtualized services, and other types of computing resources which may be available for purchase and use by customers of a computing service provider. The computing resources may have many different configurations of processor capabilities, main memory, disk storage, and operating system. In particular, the service provider environment 900 depicted illustrates one environment in which the technology described herein may be used.

The service provider environment 900 may be one type of environment that includes various virtualized service resources that may be used, for instance, to host computing instances 904a-e. For example, the service provider environment 900 may offer virtual or hardware devices, database resources and instances, file or block data storage resources, and/or networking resources, such as load balancing resources, domain name service ("DNS") resources, virtual private cloud ("VPC") resources, virtual local area network ("VLAN") resources, and/or other types of hardware and software computing resources or network services on a permanent or as-needed basis. The computing resources can also include, but are not limited to, computing instances 904a-e and images, security groups, option groups, gateways, option sets, network access control lists ("ACLs"), subnets, storage buckets, network interfaces, snapshots, spot market requests, and storage volumes.

The computing resources described above may be provided in one particular implementation by one or more data centers operated by a service provider. As known to those skilled in the art, data centers are facilities utilized to house and operate computer systems and associated components. Data centers also typically include redundant and backup power, communications, cooling, and security systems. The data centers can be located in geographically disparate regions, and can also be connected to various other facilities, such as co-location facilities, and various wide area networks 912 ("WANs"), such as the Internet.

The service provider environment 900 may be capable of delivery of computing, storage and networking capacity as a software service to a community of end recipients. In one example, the service provider environment 900 may be established for an organization by or on behalf of the organization. That is, the service provider environment 900 may offer a "private cloud environment." In another example, the service provider environment 900 may support a multi-tenant environment, wherein a plurality of customers may operate independently (i.e., a public cloud environment). Generally speaking, the service provider environment 900 may provide the following models: Infrastructure as a Service ("IaaS"), Platform as a Service ("PaaS"), and/or Software as a Service ("SaaS"). Other models may be provided. For the IaaS model, the service provider environment 900 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the service provider environment 900. End customers may access the service provider environment 900 using networked client devices, such as desktop computers, laptops, tablets, smartphones, etc. running web browsers or other lightweight client applications, for example. Those familiar with the art will recognize that the service provider environment 900 may be described as a "cloud" environment.

The particularly illustrated service provider environment 900 may include a plurality of servers 902a-e. While four servers are shown, any number may be used, and large data centers may include thousands of servers. The service provider environment 900 may provide computing resources for executing computing instances 904a-e. Computing instances 904a-e may, for example, be virtual machines. A virtual machine may be an instance of a software implementation of a machine (i.e. a computer) that executes applications like a physical machine. In the example of a virtual machine, each of the servers 902a-e may be configured to execute an instance manager 908a-e capable of executing the instances. The instance manager 908a-e may be a hypervisor, virtual machine monitor (VMM), or another type of program configured to enable the execution of multiple computing instances 904a-e on a single server. Additionally, each of the computing instances 904a-e may be configured to execute one or more applications.

One or more servers 916 may be reserved to execute software components for managing the operation of the service provider environment 900 and the computing instances 904a-e. For example, a server 916 may execute a management component 918. A customer may access the management component 918 to configure various aspects of the operation of the computing instances 904a-e purchased by a customer. For example, the customer may setup computing instances 904a-e and make changes to the configuration of the computing instances 904a-e.

A deployment component 922 may be used to assist customers in the deployment of computing instances 904a-e. The deployment component 922 may have access to account information associated with the computing instances 904a-e, such as the name of an owner of the account, credit card information, country of the owner, etc. The deployment component 922 may receive a configuration from a customer that includes data describing how computing instances 904a-e may be configured. For example, the configuration may include an operating system, provide one or more applications to be installed in computing instances 904a-e, provide scripts and/or other types of code to be executed for configuring computing instances 904a-e, provide cache logic specifying how an application cache should be prepared, and other types of information. The deployment component 922 may utilize the customer-provided configuration and cache logic to configure, prime, and launch computing instances 904a-e. The configuration, cache logic, and other information may be specified by a customer accessing the management component 918 or by providing this information directly to the deployment component 922.

Customer account information 924 may include any desired information associated with a customer of the multi-tenant environment. For example, the customer account information may include a unique identifier for a customer, a customer address, billing information, licensing information, customization parameters for launching instances, scheduling information, etc. As described above, the customer account information 924 may also include security information used in encryption of asynchronous responses to API requests. By "asynchronous" it is meant that the API response may be made at any time after the initial request and with a different network connection.

A network 910 may be utilized to interconnect the service provider environment 900 and the servers 902*a-e*, 916. The network 910 may be a local area network (LAN) and may be connected to a Wide Area Network (WAN) 912 or the Internet, so that end customers may access the service provider environment 900. The network topology illustrated in FIG. 9 has been simplified, many more networks and networking devices may be utilized to interconnect the various computing systems disclosed herein.

Figure 10:
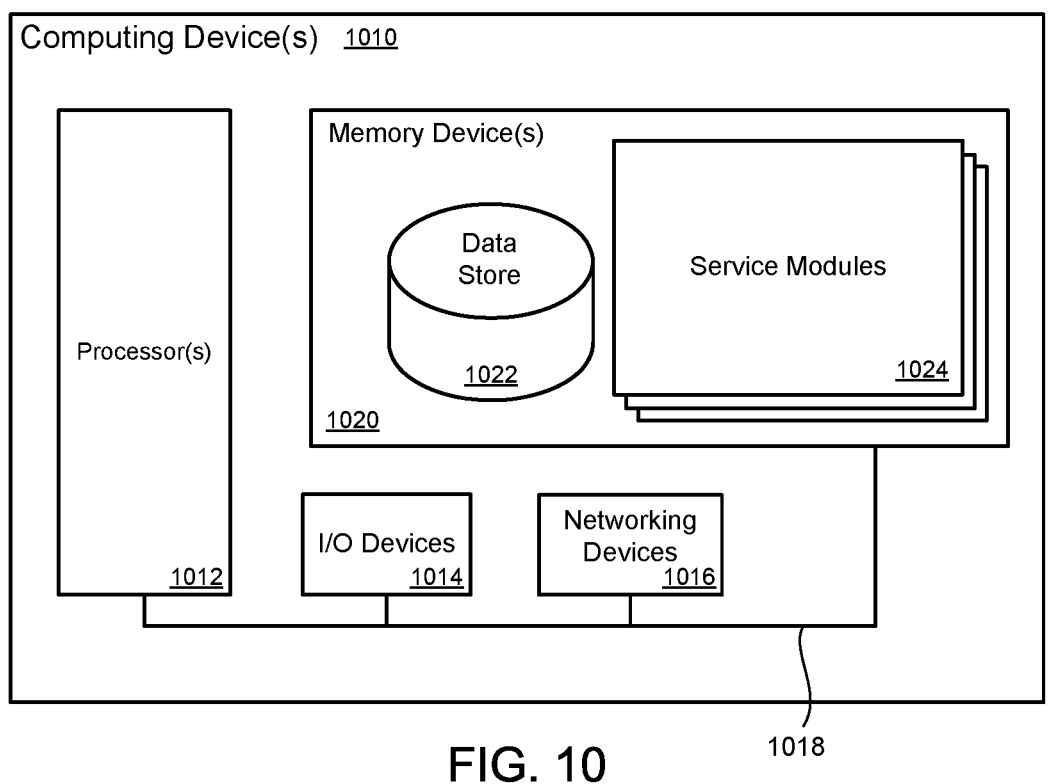
FIG. 10 is block diagram illustrating an example of a computing device that may be used to execute a method for overriding a service provider library with a local library.

FIG. 10 illustrates a computing device 1010 on which service modules of this technology may execute. A computing device 1010 is illustrated on which a high level example of the technology may be executed. The computing device 1010 may include one or more processors 1012 that are in communication with memory devices 1020. The computing device 1010 may include a local communication interface 1018 for the components in the computing device. For example, the local communication interface 1018 may be a local data bus and/or any related address or control busses as may be desired.

The memory device 1020 may contain service modules 1024 that are executable by the processor(s) 1012 and data for the service modules 1024. In one aspect, the memory device 1020 may include a function execution service module, as well as other service modules. In another aspect, the memory device 1020 may include a program code function service module, as well as other service modules. The service modules 1024 may execute the functions described earlier. A data store 1022 may also be located in the memory device 1020 for storing data related to the service modules 1024 and other applications along with an operating system that is executable by the processor(s) 1012.

Other applications may also be stored in the memory device 1020 and may be executable by the processor(s) 1012. Components or modules discussed in this description that may be implemented in the form of software using high-level programming languages that are compiled, interpreted or executed using a hybrid of the methods.

The computing device may also have access to I/O (input/output) devices 1014 that are usable by the computing devices. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor(s) 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory device 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A computer implemented method, comprising:
  receiving a program code function for execution on a computing hub, wherein the program code function is configured to interface with a shared service located in a service provider environment based on a service provider library;
  loading an instance of the program code function for execution on the computing hub, wherein the computing hub is included in a local device network that includes devices which connect to the computing hub;
  creating a merged library by combining the service provider library with a local library which provides a local service interface for a local service located on the computing hub that is similar to a shared service interface for the shared service located in the service provider environment; and
  loading the merged library in computer memory on the computing hub, wherein the local service interface overrides the shared service interface in the merged library in response to a service request generated by the instance of the program code function to provide access to the local service interface for the local service located on the computing hub.

2. The method as in claim 1, wherein receiving the program code function further comprises receiving a function deployment package that contains the program code function and the service provider library.

3. The method as in claim 1, wherein the merged library includes a local library layer that overlays a service provider library layer.

4. The method as in claim 3, wherein the local library layer includes service interfaces to local services located on the computing hub, and the service provider library layer includes service interfaces to shared services located in the service provider environment.

5. The method as in claim 3, wherein loading the merged library further comprises loading the merged library into a software container on the computing hub and updating a library path to include the merged library.

6. The method as in claim 1, further comprising:
  receiving, by a runtime service executed in a software container containing the instance of the program code function, a request to invoke the program code function; and
  invoking the instance of the program code function using a call handler for the instance of the program code function.

7. The method as in claim 1, further comprising:
  generating a service request to include an endpoint uniform resource identifier (URI) for a service linked to a service request, wherein the endpoint URI is obtained from the merged library; and
  sending the service request to the local service located on the computing hub or the shared service located in the service provider environment as defined by the merged library.

8. The method as in claim 1, further comprising referencing a merged layer of the merged library to obtain the local service interface for the local service located on the computing hub, or obtain the shared service interface for the shared service when the merged layer does not include the local service interface for the local service.

9. The method as in claim 1, wherein the instance of the program code function processes data received from the devices connected to the computing hub using, in part, one or more local services located on the computing hub, or one or more shared services located in the service provider environment when the one or more local services are not available on the computing hub.

10. The method as in claim 1, wherein the local service located on the computing hub includes at least one of: a data store service, a compute service, a device shadow service, or a messaging service.

11. The method as in claim 1, wherein the computing hub is in network communication with the service provider environment via a wide area network, and the computing hub is in network communication with the devices via a local area network.

12. A computing hub, comprising:
  at least one processor;
  at least one memory device including instructions that, when executed by the at least one processor, cause the computing hub to:

receive a program code function for execution on the computing hub and a service provider software development kit (SDK) library, wherein the program code function is configured to interface with a shared service located in a service provider environment based on the service provider SDK library;

load a software container for execution on the computing hub, the software container providing an isolated environment on the computing hub for an instance of the program code function to execute;

create a merged SDK library by combining the service provider SDK library with a local SDK library that provides a local service interface to a local service located on the computing hub that is similar to a shared service interface to the shared service; and load the merged SDK library into the software container, wherein the local service interface overrides the shared service interface in the merged SDK library to provide access to the local service located on the computing hub for service calls to the shared service interface generated by the instance of the program code function.

13. The computing hub as in claim 12, wherein the at least one memory device includes instructions that, when executed by the at least one processor, cause the computing hub to further update a library path in the software container to replace the service provider SDK library with the merged SDK library, wherein the merged SDK library includes service interfaces to local services located on the computing hub and service interfaces to shared services located in the service provider environment for which local service versions are not included on the computing hub.

14. The computing hub as in claim 12, wherein the at least one memory device includes instructions that, when executed by the at least one processor, cause the computing hub to further mount the merged SDK library in the software container, wherein service interfaces to local services located on the computing hub override service interfaces to a portion of shared services located in the service provider environment.

15. The computing hub as in claim 14, wherein the at least one memory device includes instructions that, when executed by the at least one processor, cause the computing hub to further:

reference the merged SDK library in response to a service request generated by the instance of the program code function executing in the software container;

determine that a service interface for the local service associated with the service request is not available on the computing hub; and access a service interface to the shared service located in the service provider environment.

16. The computing hub as in claim 12, wherein the program code function handles data received from devices connected to the computing hub using, in part, one or more local services located on the computing hub which includes at least one of: a data store service, a compute service, a device shadowing service, or a messaging service.

17. A non-transitory machine readable storage medium including instructions embodied thereon, the instructions when executed by one or more processors:

receive an instruction to execute a program code function on a computing hub included in a device network which includes devices that connect to the computing hub, wherein the program code function is configured to interface with a shared service located in a service provider environment;

load a merged library into computer memory on the computing hub, wherein the merged library combines a service provider library with a local library, where the service provider library indicates a service provider endpoint for the shared service located in the service provider environment, and the local library indicates a local endpoint for a local service located on the computing hub that is similar to the shared service located in the service provider environment; and invoke an instance of the program code function, wherein the local endpoint for the local service overrides the service provider endpoint for the shared service in the merged library to provide the instance of the program code function with a service interface to the local service located on the computing hub.

18. The non-transitory machine readable storage medium in claim 17, further comprising instructions that when executed by the one or more processors cause the one or more processors to load a software container on the computing hub, wherein the software container contains the instance of the program code function, the merged library, and a runtime service that provides the computing hub with an interface to the instance of the program code function.

19. The non-transitory machine readable storage medium in claim 18, further comprising instructions that when executed by the one or more processors cause the one or more processors to update a library path in the software container to point to the merged library.

20. The non-transitory machine readable storage medium in claim 18, further comprising instructions that when executed by the one or more processors cause the one or more processors to:

receive, by the runtime service executed in the software container, a service request generated by the instance of the program code function; and reference, by the runtime service, the merged library to determine whether the merged library includes the local endpoint to the local service located on the computing hub that corresponds to the service request.

* * * * *